July 6, 1937.  A. W. GERBER  2,085,745
VARIABLE SPEED, VARIABLE TORQUE CLUTCH
Original Filed Sept. 17, 1934    2 Sheets-Sheet 1
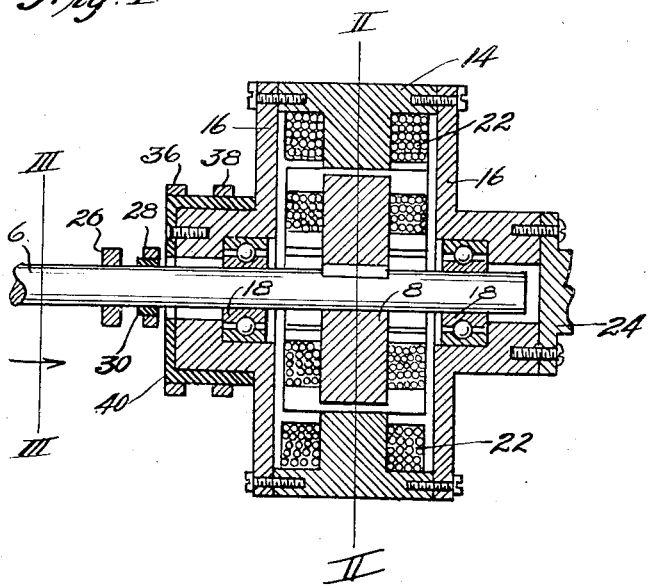
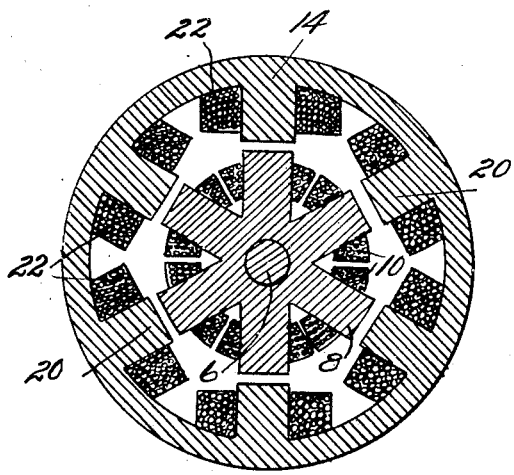
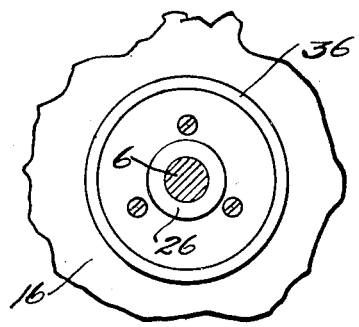
INVENTOR,
Alfred W. Gerber,
BY
Hovey & Hamilton,
ATTORNEYS.

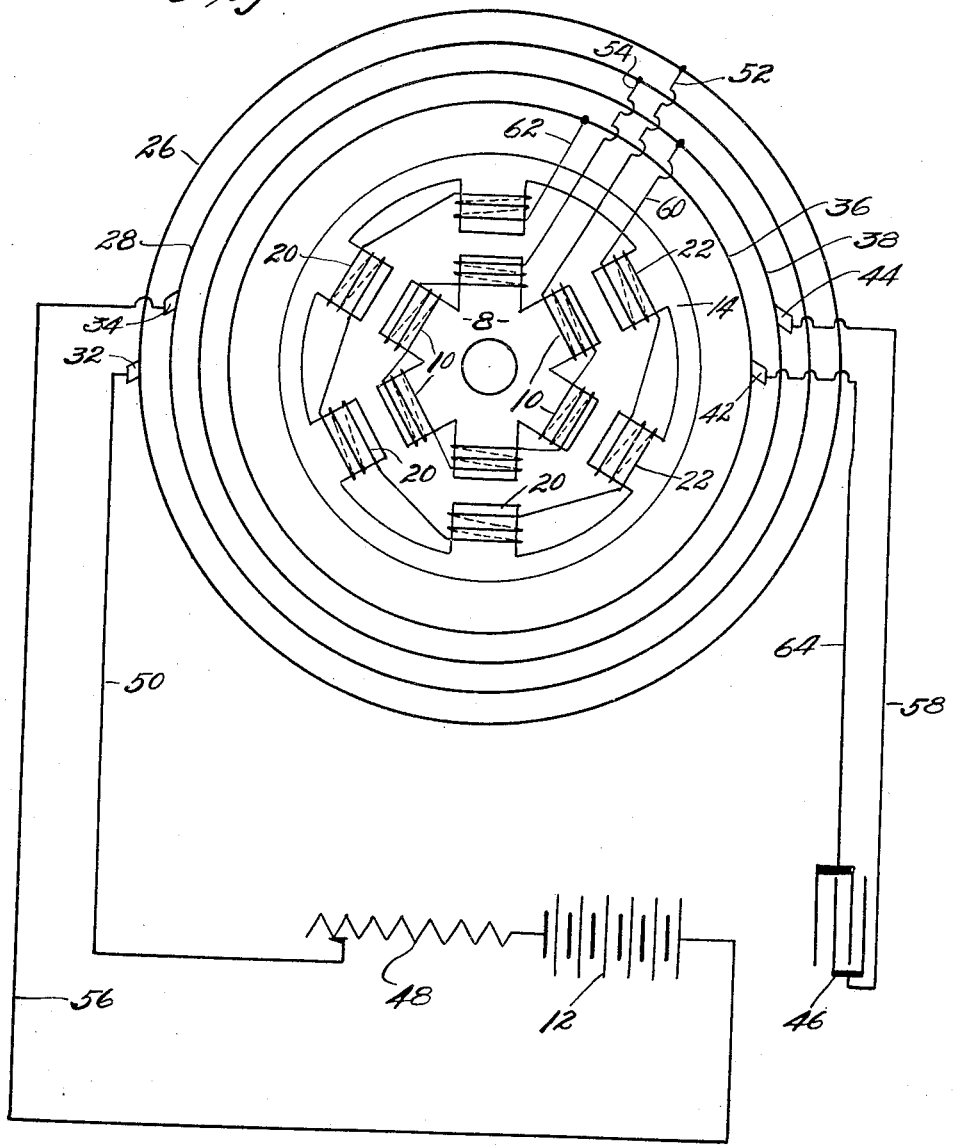

Patented July 6, 1937

2,085,745

UNITED STATES PATENT OFFICE 2,085,745

VARIABLE SPEED, VARIABLE TORQUE CLUTCH

Alfred W. Gerber, Kansas City, Mo.

Application September 17, 1934, Serial No. 744,275
Renewed April 30, 1937

2 Claims. (Cl. 172—284)

This invention relates to a magnetic device of the variable speed, variable torque clutch type, and has for a primary object, the provision of such an apparatus, wherein is embodied a driving and a driven member, said members being arranged so that the angular displacement of one with respect to the other will cause a change in reluctance of the magnetic circuit or circuits associated with said members.

One of the important aims of the present invention is to provide a variable speed, variable torque clutch having means for exciting the coils of one member thereof to establish a magnetic flux which serves as the only connecting force between the two members of the device.

Another object of this invention is to provide an electro-magnetic device that is susceptible of providing a speed range from zero to that of the prime mover, said device having associated therewith, means for varying the components of the magnetic flux so that an infinite number of increments in speed up to the maximum, may be effected.

An even further object of this invention is the contemplation of a magnetic clutch, wherein is employed a direct current component and an alternating current component to constitute the total flux, said direct current component being introduced to one of the moving members of the clutch from a remote source of supply, while the alternating current component of the total flux is generated by the relative slip of the movable members of the clutch and is controlled by an impedance network.

An even further object of this invention is to provide a variable speed, variable torque clutch which generates an alternating electro-motive force and which uses all or a portion of said force as an alternating current component of a magnetic flux for the purpose of establishing driving connection between the members of the device.

With the foregoing broad objects in view, the many minor objects which will appear during the course of the following specification will be readily comprehended and the invention, in one of its forms, will be described by reference to the accompanying drawings, wherein:

Fig. 1 is a vertical, central section through a variable speed, variable torque clutch made to embody this invention.

Fig. 2 is a cross section through the clutch, taken on line II—II of Fig. 1.

Fig. 3 is a fragmentary, sectional view taken along line III—III of Fig. 1, and looking in the direction of the arrow, and, Fig. 4 is a diagrammatical showing of the circuit employed in a clutch of the character contemplated.

Many forms of the clutch may be created to embody the invention, but in the physical embodiment of the concepts of this invention, there should be a driving shaft 6 which is actuated by some suitable prime mover, not here shown, which prime mover may be of the constant or variable speed type.

A driving member 8 is carried by driving shaft 6, and should be a laminated member presenting a plurality of radially extending cores, as shown in Figs. 2 and 4. Upon each of these cores is wound a coil 10 and it is these coils which are excited by the introduction of a direct current from any suitable source of supply, such as a battery 12, shown in Fig. 4. A driven member 14, having end pieces 16 to serve as connections to suitable bearings 18, is rigidly secured to driven member 14 so that the latter is held in circumscribing relation with driving member 8, and so that electro-magnetic force may be utilized in rotating driven member 14 as driving member 8 is excited and rotated.

This driven member 14 likewise has a number of radially, inwardly projecting core pieces 20, about each of which is wound wires to form coils 22. These coils 22 are in connection with suitable means for handling the alternating current component of the total flux established. Obviously, to produce highest efficiency, cores 20 should be laminated and as shown in Fig. 1, driven member 14 has bearing upon and rotates about driving shaft 6. To complete the connection to the work, a driven shaft 24 is secured to driven member 14 through any suitable medium.

One manner of establishing excitation within the clutch by introducing a direct current to coils 10 is here shown to be a pair of collector rings 26 and 28 respectively. The former is secured directly to driving shaft 6, while the latter is insulated therefrom by ring 30 so that the brushes 32 and 34 which are in sliding contact with rings 26 and 28 respectively may supply electrical energy from battery 12 as the prime mover is rotating shaft 6. Coils 22 are suitably connected to slip rings 36 and 38 that are mounted upon driven member 14 and insulated therefrom by a cap 40 of insulating material. Brushes 42 and 44 slidably engage the outer periphery of rings 36 and 38 respectively and these brushes are in circuit with a fixed impedance network which includes the condenser 46. It is understood that this impedance network may be variable if desired.

A resistor 48 of the variable type is interposed in the circuit which excites coils 10 and a variation of the amount of resistance in this circuit will alter the direct current component of the total flux in the clutch.

The direct current circuit as illustrated in Fig. 4 may be traced as follows: Battery 12, the effective portion of variable resistor 48, wire 50, brush 32, ring 26, wire 52, through all coils 10, wire 54, ring 28, brush 34, wire 56, to the point of beginning.

The circuit which serves to handle the electromotive force generated in the clutch and to introduce the alternating current component may be traced from condenser 46 to wire 58, brush 44, ring 38, wire 60, through all coils 22, wire 62, ring 36, brush 42, wire 64, to the point of beginning.

Obviously, the force of attraction establishes the clutching effect and any percent of the maximum torque capacity may be employed up to the full rated value of the clutch.

In the use of the device, full rated torque at one hundred percent of the driving shaft speed is obtained by fully exciting the driven member by the direct current component. To transmit full rated torque at minimum speed of the driving member, the clutch must also be fully excited by the alternating current component. Any speed-torque requirements between these aforesaid limiting conditions may be obtained by altering the amplitude of the total flux and by varying the alternating current and direct current components of the total flux. Generation of alternating current is due to the slip between the driving and driven members and the alternating current component is high when the speed is low and the slip high, conversely, when a large part of the total flux is due to the direct current component, the slip is low and the speed relatively high.

Principally speaking, the amplitude of the flux is a measure of the torque transmitted. The direct current component is a measure of the speed at which the driven member is actuated and the greater the direct current component, the higher this speed. The greater the alternating current component, the lower said speed because its amplitude depends on the aforementioned slip between the two major elements of the clutch.

It is seen from the foregoing that a highly desirable clutch is produced which is free from mechanical interconnections and which will serve to interconnect any driving and driven members where loads vary and where the prime mover is of a variable or constant speed type. The means provided for varying the flux components either automatically or manually, serve to create a balance in the combination of direct current and alternating current components, and while one specific embodiment of the invention has been shown and described, it is understood that the same is limited only by the scope of the appended claims.

Having thus described the invention, what is claimed as new and desired to be secured by Letters Patent is:

1. An electrical clutch system comprising a driving element having coils; a driven element having coils; a condenser having connection with the coils of said driven element; and means for variably exciting the coils of the driving element with direct electrical current, said driven element coils being excited by the inherent generator action of the clutch system with alternating electrical current, said direct and alternating currents producing components of the total flux in the system forming the connecting medium between driving and driven elements, the amplitude of the alternating component being controlled by the said condenser connected with the coils of said driven member.

2. An electrical clutch system comprising a driving element; coils on the driving element; a driven element; coils on the driven element; a condenser in connection with the coils of the driven member; and means for exciting the coils of the driving element, whereby a magnetic flux forms the sole means of connection between the driving and driven elements, said magnetic flux having an alternating current component variable by the said condenser and increased in amplitude as the slip between driving and driven elements is increased.

ALFRED W. GERBER.